May 19, 1970  C. J. SULLIVAN  3,513,245
METHOD AND APPARATUS FOR JOINING SHELL SECTIONS OF SODERBERG ELECTRODES
Filed Nov. 22, 1968
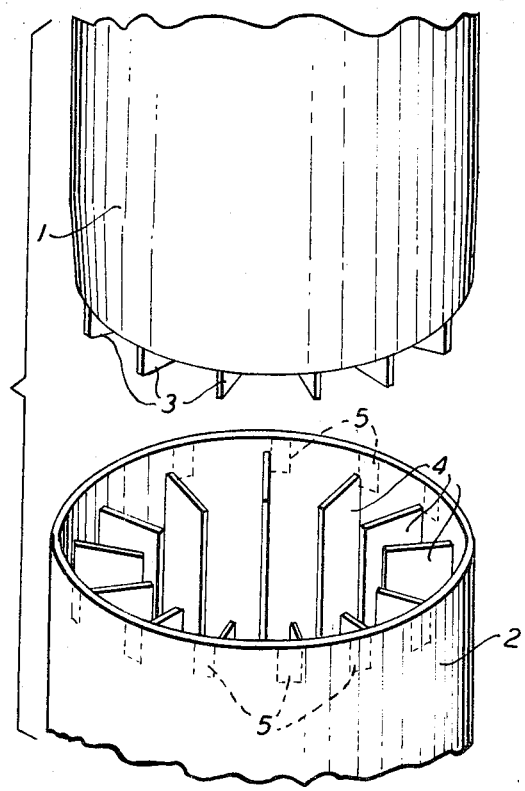
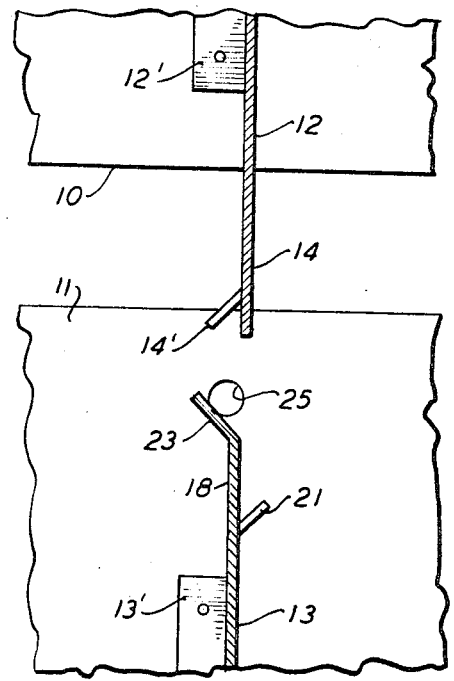
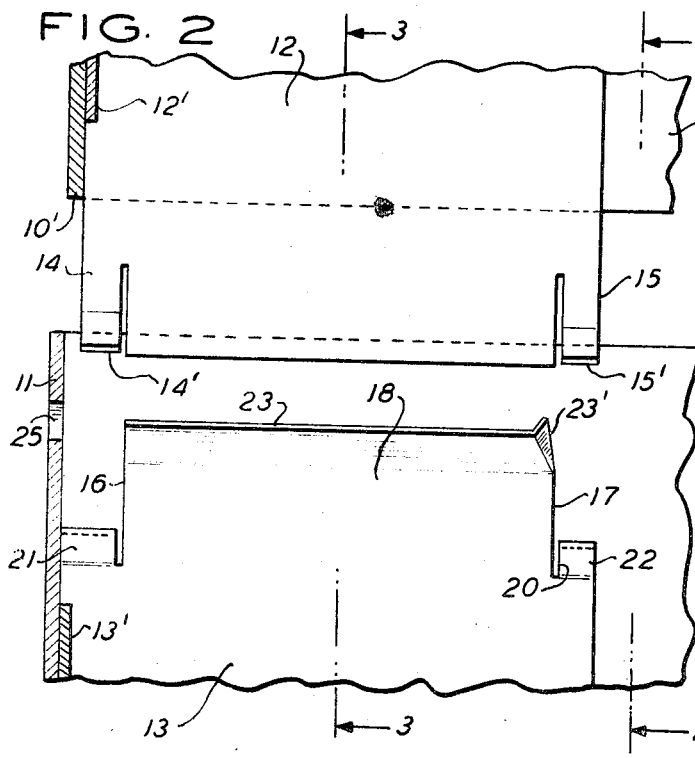
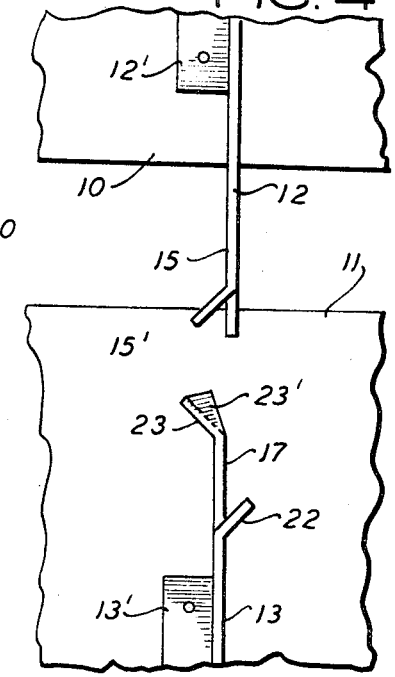
INVENTOR
CORNELIUS J. SULLIVAN
ATTORNEY May 19, 1970
C. J. SULLIVAN
3,513,245
METHOD AND APPARATUS FOR JOINING SHELL SECTIONS OF
SODERBERG ELECTRODES
Filed Nov. 22, 1968
2 Sheets-Sheet 2
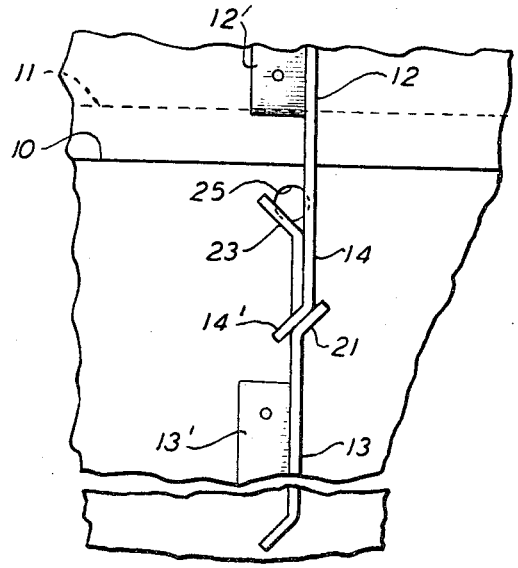
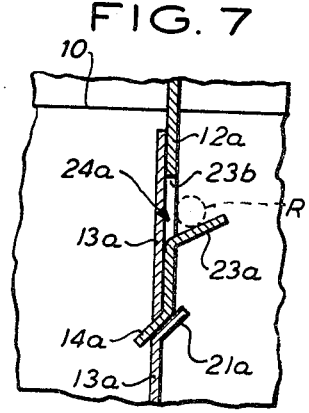
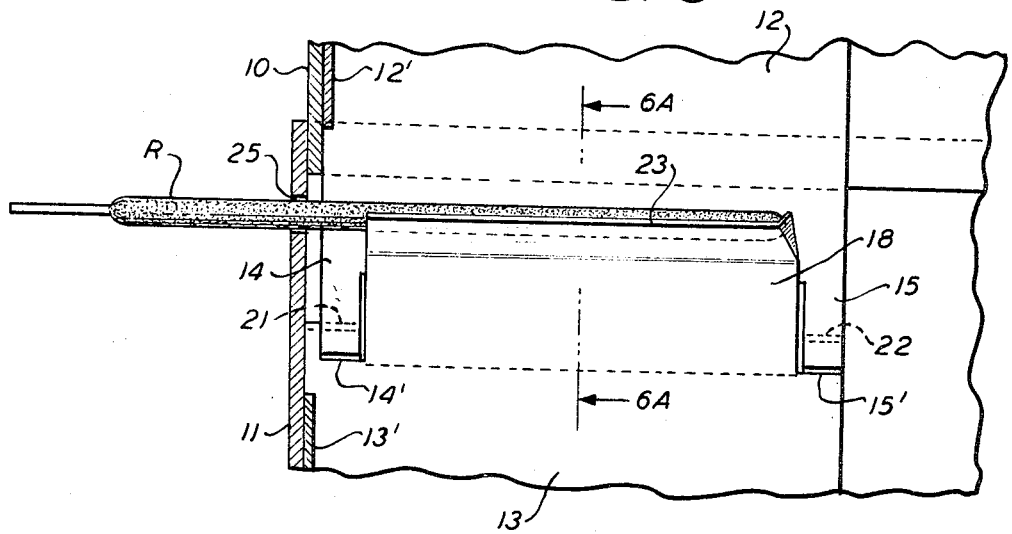
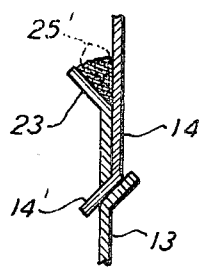
INVENTOR
CORNELIUS J. SULLIVAN
BY
ATTORNEY

# United States Patent Office 3,513,245
Patented May 19, 1970

3,513,245
METHOD AND APPARATUS FOR JOINING SHELL SECTIONS OF SODERBERG ELECTRODES
Cornelius J. Sullivan, Berkeley Heights, N.J., assignor to Air Reduction Company, Incorporated, New York, N.Y., a corporation of New York
Filed Nov. 22, 1968, Ser. No. 778,104
Int. Cl. H05b 7/10, 7/06
U.S. Cl. 13—14
19 Claims

ABSTRACT OF THE DISCLOSURE

A "Soderberg" type electrode for electric arc furnaces made in sections, each section having a steel cylindrical jacket or shell, feed continuity being achieved by joining to the existing electrode top section, a new shell section, and each shell having complementary internal radial fins that have offset self-positioning tabs that locate the shells in a continuous column. Corresponding fins of upper and lower shells overlap, with one fin having a flange for making with the overlapping fin, a horizontal welding trough. A welding rod is inserted through a preformed bore-hole opposite the trough and a welding arc is started at the far end of the trough; the rod without further manipulation burns back along the trough, following the "firecracker" weld technique. When the electrode has burned to the end of the trough, the electrode is withdrawns and the bore-hole filled with weld metal.

BACKGROUND OF THE INVENTION

This invention relates to electrodes for electric arc furnaces, such as those used in the production of ferroalloys, and specifically to large shell-encased electrodes of the Soderberg or "self-baking" type.

The Soderberg electrode is made for continuous furnace operation by joining thereto as required, similar electrode units or sections. In a well-known form, each section has a cylindrical steel shell or jacket, open at opposite ends, with an equal number of similarly positioned internal webs or fins that extend longitudinally throughout the length of the shell and radially inward. A new shell when placed in position over the top electrode section, is first joined thereto by welding; the shell, including the spaces between fins, is then packed with a carbonaceous, pitch-type filler which, as the electrode is progressively exposed to the high temperatures of the furnace, becomes graphitic and resistant to furnace temperatures in known manner; the electrode is accordingly consumed at a comparatively low rate. As indicated above, continuous feed for uninterrupted furnace operation is achieved as the electrode is consumed by successively joining new electrode shell sections to the existing top shell section, and then packing the new shell with a plastic carbonaceous filler.

Prior techniques for welding or fastening the new electrode shell section to the operational shell section have in general, been time-consuming and expensive, especially where the shell diameter is less than approximately 60 inches, and the welder must work from outside the shell. In such instances, peripherally spaced openings or "windows" of ample size corresponding to the peripheral positions of the shell fins, have been made in the shell for accommodating equipment to be inserted and manipulated for welding adjoining parts of the complementary upper and lower shell fins, respectively. After this interior fin welding operation has been completed, the numerous window blanks are welded back in their respective places for permanently closing all the openings. It is seen therefore, that a large amount of welding-time is consumed by this method of joining electrode shell sections for achieving continuous electrode feed.

SUMMARY OF THE INVENTION

In accordance with the invention, the matching fins of mating electrode shells are preformed for self-positioning so that when the upper shell is set approximately in place, the adjoining shell fins overlap and initially make engagement at the self-positioning means that, in turn, under the weight of the upper shell automatically force the overlapping parts of the fins into close matching engagement; coincident therewith, a welding receptacle or trough is formed between a shelf-like flange on one fin and the side of the juxtoposed fin. Small apertures for receiving a standard welding rod are preformed in the shell at peripheral points so as to be opposite the respective welding troughs. Fin welding is accomplished by inserting the welding rod through the aperture and along the trough to the far end where the welding arc is started by contacting a small pre-formed tab. The rod without further manipulation progressively deposits weld metal in the trough as it is consumed; when the rod has burned to the trough end nearest the aperture, it is withdrawn from the shell and the aperture is permanently closed by filling it with remaining rod metal.

A principal object of the invention therefore, is an improved method and means for joining the shell sections of Soderberg type electrodes that afford large savings in welding time.

A related object of the invention is an improved and simplified welding technique for joining by strong and rugged welds the corresponding fins of the matching shell sections of Soderberg electrodes.

Other objects, features and advantages will appear from the following description with reference to the accompanying drawings.

BRIEF DESCRIPTION OF THE DRAWINGS

FIG. 1 is a perspective partial view of two matching shell sections of a known form of continuous electrode for electric furnaces;

FIG. 2 is a partial view in elevation section of pre-assembled matching shell sections for an electrode of similar type embodying the invention;

FIG. 3 is a sectional view taken along the line 3—3 of FIG. 2;

FIG. 4 is a sectional view taken along the line 4—4 of FIG. 2;

FIG. 5 is a partial view, following FIG. 3, showing the electrode shell and fin positioning structure in matched relation for final welding;

FIG. 6 is a similar view showing the electrode shell and juxtapositioned fin structure, following FIG. 2, with welding rod in the trough in starting position;

FIG. 6A is a detail view in section of the trough weldment, and

FIG. 7 is a partial view in section illustrating an alternative arrangement of the overlapping fins for making a welding trough.

DESCRIPTION OF PREFERRED EMBODIMENTS

The technique as followed prior to the invention, for uniting shell sections of Soderberg electrodes generally described above, will first be outlined in connection with FIG. 1, wherein a pair of matching open-end steel cylinders or shells 1 and 2 have welded to the inner walls a plurality of steel fins 3 and 4 respectively. The matching fins of each shell are peripherally equally spaced and extend generally throughout the length of each shell parallel to the longitudinal axis, and radially inward for a distance less than the radius of the shell.

For welding purposes and for generally uniform electrode diameter, each shell is slightly tapered at the lower edge, to allow for shell thickness so that the lower part of shell 1, for example, telescopes within the upper part of shell 2 a short distance for ensuring sufficient longitudinal rigidity. The fins lengthwise, extend from near the top edge of a respective section, e.g., the fins 4 of shell 2, to a suitable distance below the bottom edge, e.g., the fins 3 of shell 1, for aligning the respective section fins in over-lapping relation where they are joined in conventional manner by welding.

In practice, the upper shell section 1 is lowered into the lower shell section 2 for telescoping engagement therewith, with the matched section fins 3 and 4 engaging each other in over-lapping relation. Assuming that the diameter of the electrode is too restricted for a welder to work efficiently within the shells, the welder works from the exterior through peripherally spaced windows or openings cut in the upper part of each shell conveniently opposite the over-lapping fin edges, as indicated for the shell 2, at 5. The windows are of sufficient size to admit a conventional welding electrode holder and to give the welder proper freedom of movement for joining the overlapped fins along a transverse edge. After the fins around the shell periphery have been joined, the respective window blanks (previously cut out) are welded back in their original positions for permanently closing the shell. As stated above, this technique involves a considerable amount of total welding time for joining and finishing the electrode shell sections.

In this form of arc furnace electrode, the electric current in the upper or cooler part is mainly carried by the enclosing integral steel shell and fins, due to the comparatively poor electrical conductivity of the carbonaceous filler before it has been subjected to the "baking" effect of furnace tempeartures at the lower arcing end of the electrode. It is therefore important that sound, full-section welds be made between the mating ends of both the shell sections and corresponding fins for minimizing electrical resistance at the section joints; also, such welds give high mechanical strength to the electrode column for minimizing break-off of a portion of the electrode within the furnace. The improved technique of the invention lends itself to the making of sound welds for these purposes.

FIG. 2 illustrates the improved and simplified shell section structure of the invention, wherein the upper and lower steel shells, tapered for conventional telescopic engagement, are partially indicated at 10 and 11. As the matching section fins at each radial position around the shell periphery have the same complementary configuration, it will be sufficient for a complete understanding of the invention to illustrate in detail the matching structure of the upper and lower shell fins at a single radial position.

FIGS. 2, 3, and 4 illustrate the corresponding joining ends of the upper and lower shell sections 10 and 11 with the attached matched fins 12 and 13 respectively, in vertical alignment, prior to stacking as illustrated in FIG. 1. The fin 12 of the upper shell section is shown as extending beyond the lower edge 10' of the shell for a short distance, the fin at its lateral sides terminating in a pair of spaced tabs 14 and 15, FIGS. 2 and 3. Each tab at 14' and 15' respectively, is bent through about 45°, both tabs extending in the same direction from the plane of the fin as indicated in FIG. 3.

The complementary matching end of the fin 13 of the lower shell section 11 is recessed somewhat within the shell as shown in FIG. 2, so as to be over-lapped by the fin 12 in the stacked position. For matching engagement with the fin 12, the fin 13 is cut away at 16 and 17 along both its sides for a limited distance to form an intermediate section 18, the width of which is spanned by the upper fin tabs 14 and 15. At the foot of section 18 at each cut-away portion, the fins are cut and bent at 19 and 20 through about 45° to form aligning tabs 21 and 22 that extend opposite in direction to that of tab ends 14' and 15', FIG. 3. These vertically aligned tabs, 14 and 15 of fin 12, and 21 and 22 of fin 13, make engagement as hereinafter described, for bringing together the overlapping fin portion of both shell sections.

For achieving the improved shell section welding method and weldment of the invention, the over-lapping fin portions, when in juxtaposition, have complementary configuration for together making a welding receptacle or trough in which welding metal can be deposited for joining the respective fins. To this end, the upper edge of the fin section 18 is uniformly bent along a horizontal line throughout in the preferred embodiment, about 45° from the plane of the fin in direction opposite to that of tabs 21 and 22, FIG. 3, to form a transverse shelf-like flange 23. This flange forms with the plane side of the other fin the welding trough, as presently described. One corner of the flange at its far end is bent back about 90° in re-entrant manner to form a start-plate or tab 23' for the welding arc, FIG. 4.

The fins of both shells are preformed and have lateral flanges 12' and 13' respectively, that are joined to the respective inner walls of the shells by spot-welding or the like. Likewise, the shells near the upper ends are drilled to form bore-holes at peripherally spaced points (as shown in lower shell 11), the diameter of each drill hole being about 25% larger than the diameter of the welding rod to be used, for defining a preformed welding aperture or bore 25 that is horizontally aligned with the fin flange 23, generally as indicated in FIG. 3.

For uniting the sections, the shell 10 is lowered into telescopic engagement with shell 11, FIG. 5, with the matching fins in close vertical alignment. As the shell 10 is guided and settles into place, the upper fin tabs 14 and 15 engage the corresponding 45° surfaces of the lower fin tabs 21 and 22 and tend by camming action to force the over-lapping fin 12 closely against the portion 18 of fin 13. In this position, the flange 23 makes with the adjoining plane side of the fin 12, a horizontal trough 24 that is in transverse alignment with the bore 25 and that is comparatively tight for retaining welding metal.

Welding metal so retained joins the fins in a strong and rugged weldment. The actual welding is achieved simply by inserting a welding rod R through the bore 25 and along the trough 23 until the rod tip engages the arc starting tab 23', as indicated in FIG. 6. The arc is then started and feld metal is progressively deposited in the trough without manipulation by the welder, in what is commonly known as the "firecracker" weld technique. The completed weldment of the over-lapping fins is shown in section by FIG. 6A, wherein the amount of weld metal actually required is somewhat exaggerated for purposes of illustration.

When the weld metal has been deposited throughout the length of the trough, the arc rod, now mostly consumed, is withdrawn from the bore 25; the bore is then filled with weld metal remaining for permanently closing that part of the shell. When the respective bores around the shell periphery are closed, the shells at the outer overlapped portion are united by conventional welding technique.

The invention obviously is not limited to the specific fin configuration shown by FIGS. 2 to 6A for self-positioning the fins and making-up the welding receptacle; for example, the shelf or flange constituting one side of the receptacle can be formed on the lower end of an upper shell fin as shown in FIG. 7. Here, a fin 12a of the upper shell 10 for example, is cut (or stamped) intermediate its lateral edges for making a shelf-like horizontal flange 23a that is bent from the plane of the fin about 70° to 80°, as preferred, better to accommodate the welding rod R. The overlapping ends of the upper and lower fins 12a and 13a are cammed by the coacting positioning tabs 14a and 21a respectively into close planar contact as described above. Because of the existing slot 23b formed in making the flange 23a, the welding trough 24a in this instance, is now made between the side of fin 13a facing the slot, and the flange 23a of fin 12a.

As the fin 12a is necessarily continuous along a narrow strip along each end of the transverse slot 23b, the weld rod R does not actually rest (as in FIG. 6) against the fin 13a; however, by increasing the flange angle as noted above, the weld rod can be sufficiently close to the bottom of the trough for depositing weld metal therein and making a good weld of the fins.

As indicated above, the fins are preformed according to a predetermined pattern prior to spot welding within the shell; also, the bores 25 in the shell wall are conveniently drilled in advance, so that when the shell and corresponding fins are jigged for assembly, the bores line up with the respective welding receptacles 24 for easy application of the "firecracker" weld technique. Accordingly, when a shell section is positioned for final welding, the welder can proceed with minimum interruption in actual arc-welding time, from one fin position to the next around the shell periphery.

It shall be understood that the term "flange" as used herein, is not necessarily limited to planar configuration of a receptacle or trough-forming fin extension, but is intended to comprehend either planar or curved portions for making between the overlapping fins a horizontal receptacle for retaining the weld metal; also by "trough" is meant a trough-like receptacle that is not necessarily open at the top.

In practicing the invention, the welding time for joining shell sections of Soderberg type electrodes as described above, is strikingly reduced; in fact, actual sample tests indicate that the man-hours required per shell joint can be reduced from 50 to 75 percent over prior techniques. The invention also lends itself to precise and efficient full-section welding, and to marked simplification of the entire shell-joining operation.

Having set forth the invention in what is considered to be the best embodiment thereof, it will be understood that changes may be made in method and apparatus as above set forth without depatring from the spirit of the invention or exceeding the scope thereof as defined in the following claims.

I claim:

1. In continuous feed of a multiple-section electrode for an electric arc furnace, the electrode sections being matched for adding new sections progressively in vertical alignment as the electrode is consumed and each section including a tubular shell having on its inner wall a plurality of longitudinal, radially positioned fins for alignment in overapping relation with corresponding fins of adjoining shell sections, the respective fins having complementary configurations for making between them when in overlapping engagement, a horizontal trough, and each shell section having at one end peripherally spaced apertures in general radial alignment with the fins respectively, the method of uniting matched upper and lower shell sections which comprises:
    (a) placing the upper shell in vertical alignment on the lower shell for overlapping the ends of the respective matching fins and bringing the overlapping fin portions into close engagement for making a welding receptacle between them opposite each aperture,
    (b) inserting from the shell exterior a welding rod through the aperture and along the receptacle throughout its length, and
    (c) starting an arc at the far end of the receptacle and burning the rod throughout the length of the receptacle for depositing weld metal therein and joining the overlapping fins.

2. The method as specified in claim 1 wherein coincident with positioning of the upper shell, the overlapping fin portions are cammed into close planar engagement for making a tight receptacle between them.

3. The method as specified in claim 1 wherein a flange extending transversely across one fin portion makes with the overlapping fin portion a welding trough.

4. The method as specified in claim 2 wherein the overlapping fins are cammed together by coacting tabs extending angularly from the respective planes of the fins.

5. The method as specified in claim 4 wherein the coacting tabs are bent from lateral sides of the overlapping fins respectively, and are in bridging relation to the receptacle when in camming engagement.

6. The method as specified in claim 1 wherein one fin at the far end of the receptacle is bent inwardly to form an arc-starting tab, and the welding rod is extended along the receptacle to engage the starting tab.

7. The method as specified in claim 1 wherein the remaining weld rod is withdrawn from the aperture when it has burned the length of the receptacle, and the aperture is filled with weld metal for permanently closing the shell.

8. The method as specified in claim 1 wherein the fins and shell apertures are preformed prior to fixed mounting of the fins within the respective shell.

9. The method as specified in claim 1 wherein the fins of a respective shell are recessed at one end within the shell and at the other end extend beyond the shell for overlapping with the recessed fins of the matching shell, and a trough is made between the overlapping fin portions.

10. An electrode for an electric arc furnace composed of matched, stacked sections to which new sections are individually joined as the electrode is consumed, each new section having a jacket-like casing comprising:
    (a) a tubular shell,
    (b) a plurality of longitudinal, radially positioned fins extending from the inner wall of the shell,
    (c) the corresponding fins of adjoining shell sections being aligned for overlapping each other at the ends thereof,
    (d) the overlapping fins being formed for making with each other a transverse receptacle for retaining weld metal, and
    (e) the corresponding tubular shell having an aperture opposite the near end of each welding receptacle for admitting a welding rod into the receptacle for extension along the length thereof.

11. An electrode shell section as specified in claim 10 wherein the transverse receptacle is made between a laterally projecting part of one fin, and the overlapping fin.

12. An electrode shell section as specified in claim 10 wherein each fin has camming means coacting with similar means on the aligned fins of adjoining shell sections for bringing together the overlapping fin portions in accordance with relative longitudinal positioning movement of the aligned fins.

13. An electrode shell section as specified in claim 12 wherein the camming means constitute tabs, and each tab is bent at a similar camming angle from the respective fin for automatically positioning the aligned fins in accordance with lowering of the upper shell section into position.

14. An electrode shell section as specified in claim 12 wherein the camming means on each fin are located at upper and lower parts of the fin respectively, and are laterally spaced in bridging relation to the transverse receptacle.

15. An electrode shell section as specified in claim 10 wherein one of the overlapping fins making up the receptacle includes at the receptacle end remote from the shell an arc-starting tab.

16. An electrode shell section as specified in claim 11 wherein the laterally projecting part constitutes a transverse portion of a respective fin bent approximately 45° from the plane of the fin to form a flange extending across one side of the fin, and the opposite side of the fin makes planar contact with the overlapping fin.

17. An electrode shell section as specified in claim 16 wherein self-positioning means at the overlapping ends of aligned fins of the adjoining shell sections hold the flange against the adjacent overlapping fin side for making therewith a welding trough.

18. An electrode shell section as specified in claim 10 wherein one fin has at an overlapping end and intermediate its lateral edges a horizontal slot, and a shelf-like strip extends from the lower edge of the slot to constitute the laterally projecting part for making with the overlapping fin at the opposite side facing the slot a welding trough.

19. In a multiple-section electrode for continuous feed in electric arc furnaces wherein matched sections are vertically stacked as the electrode is consumed, each section comprising a cylindrical steel shell and a plurality of longitudinal fins extending radially from the inner wall of the shell for a distance less than the shell radius, the fins overlapping and interengaging the corresponding fins of adjoining vertically aligned shell sections, the overlapping ends of said fins having complementary portions forming a horizontal retaining receptacle therebetween, and each receptacle containing weld metal making a permanent weldment of the overlapping fins of the adjoining shell sections.

References Cited

UNITED STATES PATENTS 2,193,434  3/1940  Sem _____ 13—18

FOREIGN PATENTS 407,561  12/1924  Germany.
669,170  3/1952  Great Britain.

H. B. GILSON, Primary Examiner

U.S. Cl. X.R.

13—18